UNITED STATES PATENT OFFICE.

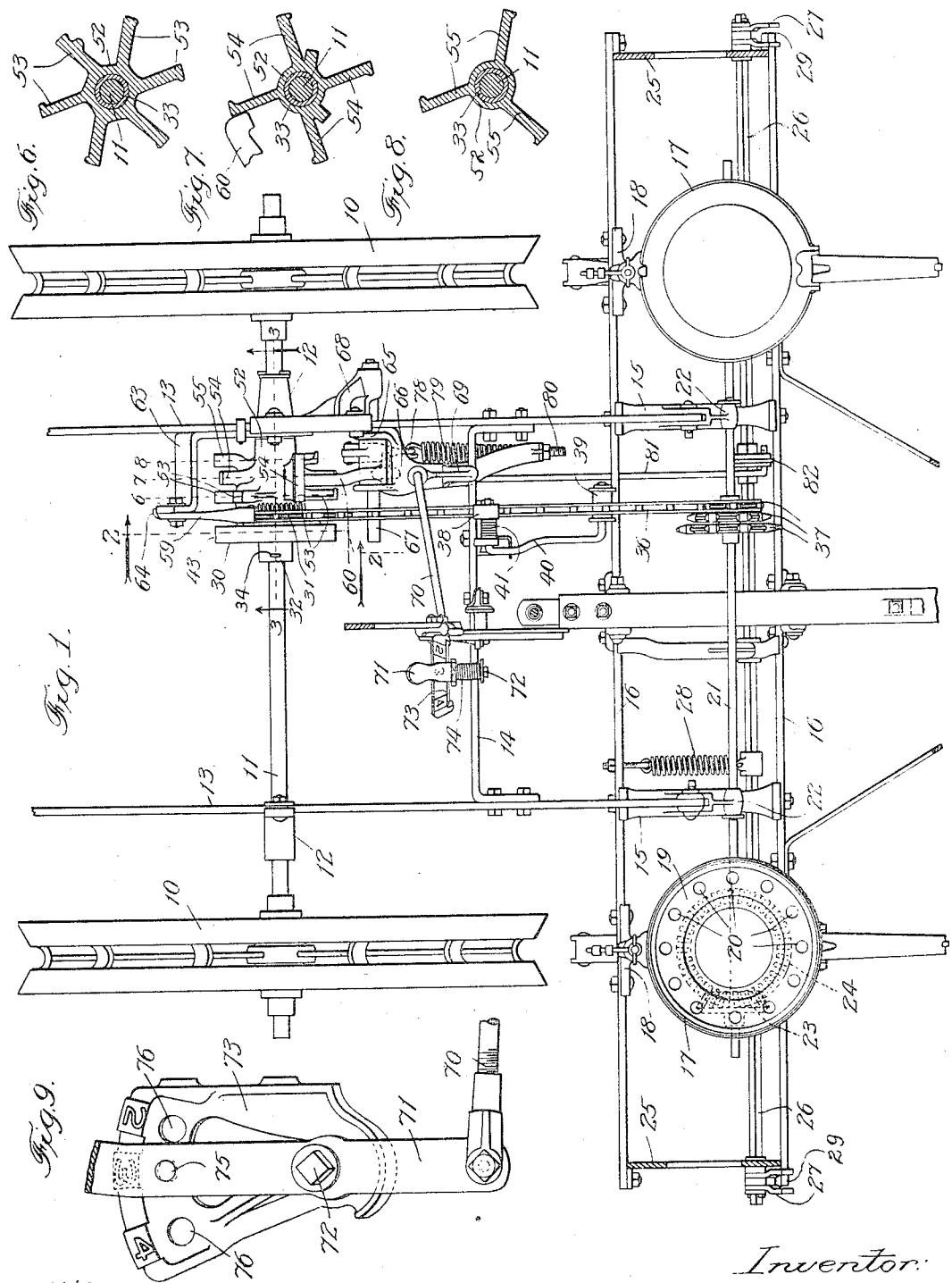

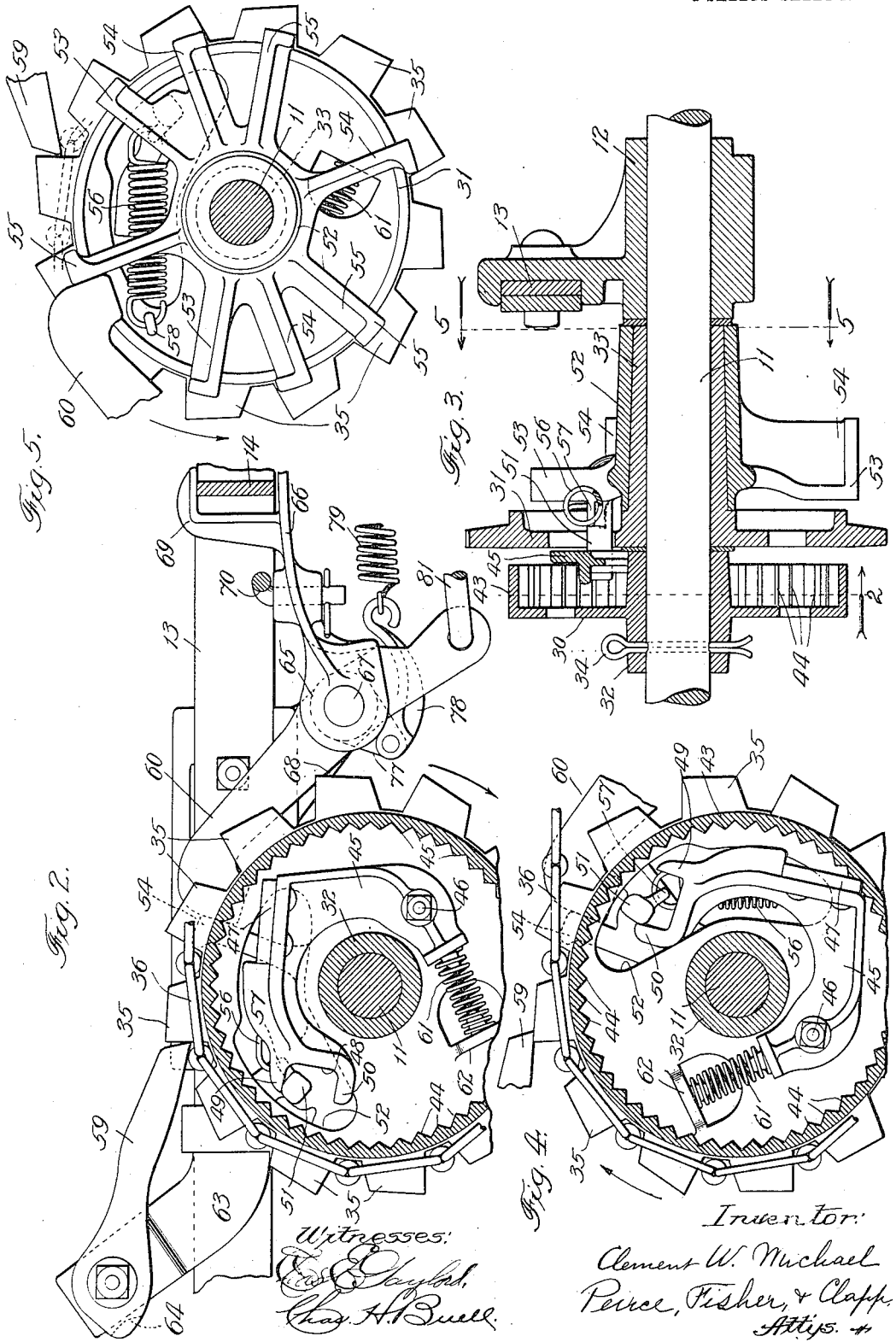

CLEMENT W. MICHAEL, OF RACINE, WISCONSIN, ASSIGNOR TO J. I. CASE PLOW WORKS, OF RACINE, WISCONSIN, A CORPORATION.

CLUTCH MECHANISM.

1,052,740.  Specification of Letters Patent.  Patented Feb. 11, 1913.

Application filed September 13, 1911. Serial No. 649,113.

*To all whom it may concern:*

Be it known that I, CLEMENT W. MI-CHAEL, a resident of Racine, county of Racine, and State of Wisconsin, have invented certain new and useful Improvements in Clutch Mechanism, of which the following is a specification.

The invention relates to clutch mechanism and more particularly to clutch mechanism employed for effecting the intermittent operation of the seed plates of a corn planter.

The invention seeks to provide a simple and effective form of clutch by which a variable throw may be imparted to the seed plates of the planter and thereby effect the planting of different numbers of seeds in the hills.

The invention also seeks to improve the clutch construction to render it certain and accurate in operation, and to provide means whereby the clutch mechanism is accurately held in idle position to thereby insure the accurate alinement of the cells of the seed plates with the discharge openings of the hoppers of the planter.

The invention consists in the features of improvement hereinafter set forth, illustrated in the preferred form in the accompanying drawings and more particularly pointed out in the appended claims.

In the drawings, Figure 1 is a plan view of a corn planter with the present improved clutch mechanism applied thereto. Figs. 2 and 3 are vertical transverse and longitudinal sections of the improved clutch mechanism taken on the lines 2—2 and 3—3, respectively, of Fig. 1. Fig. 4 is a view similar to Fig. 2, showing the clutch parts in engaged position. Fig. 5 is a section on the line 5—5 of Fig. 3. Figs. 6, 7 and 8 are detail sections on the lines 6—6, 7—7 and 8—8 of Fig. 1. Fig. 9 is a detail view in elevation of a part of the shifter mechanism for the clutch controlling trip.

The corn planter illustrated is carried upon supporting and covering wheels 10 that are connected to the ends of a wheel axle 11. The wheel axle is journaled in boxes 12 fixed to the side bars 13 of the planter. The side bars 13 are connected in front of the axle by a cross-bar 14. At their forward ends the side bars are pivoted to brackets 15 which extend between the front and rear bars 16 of the front runner frame.
The seed cans or hoppers 17 of the planter are mounted upon suitable supports 18 on the front runner frame. Each can or hopper is provided with a rotatable seed measuring plate 19 having cells 20 therein by which the seeds are delivered, one at a time through the discharge opening of the hopper. A drill shaft 21 is journaled in bearings 22 on the brackets 14 and carries a beveled pinion 23 at each end for driving the seed plate and the adjacent hopper through the medium of a beveled gear 24 suitably connected to the seed plate. The end bars 15 and 16 of the front runner frame are connected by cross pieces 25 and a check-row rock shaft 26 is journaled at its ends in these cross pieces. This shaft is provided with the usual forks 27 on its ends for engagement with the knots of the check-row wire. The parts thus far described may be of any usual or suitable construction. A spring 28 extending between the rock shaft and the rear bar 16, normally holds the rock shaft in position with the forks 27 against suitable stops 29 at the ends of the front bar 16.

The improved clutch mechanism is preferably mounted upon the wheel axle 11 which constitutes the main drive shaft of the machine. This intermittently operated clutch comprises rotary driving and driven members which, in the embodiment of the invention illustrated, are in the form of a clutch disk 30 and a sprocket wheel 31. These clutch members are provided with sleeve-like hubs 32 and 33 through which the axle or drive shaft 11 extends. The driving or "tight" clutch member or disk 30 is fixed to the shaft during the operation of the machine in any suitable manner as, for example, by means of a cotter pin 34. The driven or "loose" clutch member 31, in the form shown, is provided with a series of sprocket teeth 35 and a chain 36 passes over the "loose" clutch member or sprocket wheel 31 and over a sprocket wheel fixed to the drill shaft 21. Preferably, as shown, a series of sprocket wheels 37 of different sizes are mounted on the drill shaft and the chain is arranged to engage any one of them. The chain 36, as shown, passes beneath a guide roller 38 and over a tightening roller 39 on the end of an arm 40. The tightening roller is pressed against the chain to take up slack therein by a spring 41. Other means may be employed for connecting the "loose" or driven clutch member to the drill shaft or it could, if desired, be mounted directly upon the drill shaft.

The driving clutch member or disk 30 is provided with a laterally projecting flange 43 and a series of teeth 44 formed upon its inner face. These teeth are arranged to be engaged by a clutch dog 45 which is eccentrically pivoted upon the face of the driven clutch member 31 by a bolt 46. The particular form of clutch dog illustrated is somewhat L-shaped and is provided at its corner with a wear plate 47 which engages the teeth 44 of the clutch disk 30. One end of the clutch dog is provided with a notch or recess 48 between two lugs or shoulders 49 and 50 and a stud 51 projects through an opening 52 in the driven clutch member or sprocket 31 into the recess 48. This stud is fixed to a rotatable clutch controlling member, the sleeve-like hub 52 of which is mounted upon the hub 33 of the driven clutch member 31. This clutch controlling member has a number of sets of radially projecting stop arms 53, 54 and 55, as shown in Figs. 1, 3, 5, 6, 7 and 8. As stated, these arms are arranged in several sets and each set in a separate plane and there are a different number of uniformly spaced arms in each set. In the particular form of clutch illustrated there are six arms 53, four arms 54 and three arms 55, all mounted upon the common hub 52. The stop arms of each set are uniformly spaced apart and some of the arms 54 of the middle set are in line with other of the arms 53 and 55 of the other two sets and, in the construction shown, are formed in piece therewith.

A coiled spring 56 extends between the lugs 57 and 58 formed respectively upon the clutch controlling member and on the sprocket wheel or driven clutch member 31. The driven clutch member 31 is held against backward movement by a retaining pawl 59 which engages the teeth 35 thereof and the spring 56 tends to rotate the clutch controlling member in forward direction and thereby through the medium of the lug 51, move the clutch dog 45 into engagement with the teeth 44 of the driving clutch disk 30. The driven clutch member is held stationary with the clutch dog 45 disengaged and the spring 56 under tension by a trip arm 60 which is arranged to engage one of the stop arms of the clutch controlling member. A spring 61 (see Figs. 2 and 4) extends between a lug 62 on the driven clutch member 31 and the pivoted end of the clutch dog and this spring tends to move the clutch dog away from the ratchet teeth 44, so that the clutch dog is held in its disengaged position by the spring 61 with the lug 49 on the opposite end of the dog against the projecting lug 51 of the clutch controlling member.

When the trip 60 is shifted and disengaged from one of the stop arms, the spring 56, as stated, oscillates the clutch controlled member in forward direction and the lug 51 on the latter acts against the lug 49 on the clutch dog 45 and moves the dog into engagement with the driving clutch disk 30. The driven clutch member 31 is then rotated and the sprocket chain 36, drill shaft 21 and seed plates 19 are advanced until another stop arm engages the trip arm 60. The movement of the clutch controlling member is then arrested, but the forward movement of the driven clutch member and parts connected thereto is continued until the lost motion between the lug 51 on the clutch controlling member and the lug 50 on the clutch dog is taken up. This position of the parts is shown in Fig. 4. The continued forward movement of the clutch members forces the dog out of engagement with the ratchet teeth 44 and the spring 61 then acts to further shift the clutch dog away from the ratchet teeth to its completely disengaged position shown in Fig. 2. This movement of the dog is arrested by the engagement of the lug 49 thereon with the lug 51. The spring 56 is stronger than the spring 61 so that, when the trip 60 is shifted, the dog 45 will be forced to its engaged position against the tension of the spring 61. Moreover, the axis of the spring 61 in the disengaged position of the dog shown in Fig. 2, extends slightly on one side of the pivot 46 of the dog, so that the leverage exerted by the spring is less than that exerted by the spring 56. In the engaged position of the dog, the axis of the spring 61, in the form shown, extends through the pivot of the dog so that it exerts little or no effect upon the dog. Furthermore, the forward thrust of the ratchet disk upon the dog securely holds it in engaged position against any tension exerted thereon by the spring 61. As soon, however, as the trip acts, through the medium of the clutch controlling member to initially disengage the dog, the spring 61 further shifts the latter away from the teeth of the ratchet and thus prevents the chattering of the dog upon the ratchet teeth or the accidental engagement of the clutch members. Upon the complete disengagement of the clutch members the retaining pawl 59 engages one of the teeth 35 and holds the driven clutch member against backward movement. This pawl engages the teeth outside of the sprocket chain 36 and for this purpose the teeth 35 are extended and provided with properly shaped outer end portions which form in effect ratchet teeth upon which the retaining pawl acts. This pawl is pivotally mounted upon an inwardly and rearwardly projecting bar 63 that is secured to the adjacent side bar 13. A lug 64 on the tail end of the pawl overlaps the rear edge of the bar 63 and limits the movement of the pawl. As the driven clutch member is thus held against backward movement, the clutch controlling member is moved forwardly by the spring 56 as soon as the trip 60 is shifted clear of one of the stop arms. The trip cannot then again arrest the stop arm from which it has been disengaged so that the clutch members are always engaged with certainty whenever the trip 60 is shifted. In the present construction the clutch controlling member has three, four and six arms, respectively, in the different sets thereof and the sprocket wheel or driven clutch member 31 has twelve teeth so that the retaining pawl 56 will always properly engage one of the teeth when the trip 60 is in engagement with any one of the stop arms.

The trip 60 can be shifted into line with any one of the sets of arms so that the loose clutch member can be rotated to one-sixth, one-fourth or one-third of a revolution at each operation. The trip is provided intermediate its ends with a hub portion which is arranged between a pair of lugs 65 on a bracket 66 (see Figs. 1 and 2) and the trip and bracket are slidably mounted upon a horizontal pin or bolt 67 that is fixed at its outer end to a lug 68 that depends from the adjacent side bar 13. The pin or bolt 67 also serves as a pivot upon which the trip oscillates into and out of engagement with the stop arms of the clutch controlling member. The forward end of the bracket 66 is also slidably mounted upon the cross bar 14 of the planter frame. The main portion of the bracket extends beneath the cross-bar and is provided with an upwardly projecting hook lug 69 which overlaps the cross-bar. A link 70 connects the bracket to the lower end of a shift lever 71. This lever is pivotally connected by a bolt 72 to a bracket 73 fixed on the planter frame. A spring 74 (see Fig. 1) on the bolt 72 holds the lever in position with a projection 75 thereon in engagement with one of a series of holes 76 in the upper portion of the bracket 73. By this means, the bracket 66 can be shifted laterally to bring the trip 60 in line with any one of the sets of arms on the clutch controlling member.

The hub of the trip 60 is provided with a projecting arm 77 and a curved link 78 pivoted to the arm is connected to the rear end of a spring 79. The forward end of the spring is connected to the forward end of the bracket 66 by an adjusting screw 80. The spring 79 holds the trip in normal position with its rear end in engagement with one of the stop arms of the clutch controlling member. A link rod 81 is connected at its rear end to the tail or lower end of the trip 60 and at its forward end it is connected to an arm 82 on the check-row rock shaft 26. When the knot on the check-row wire strikes one of the forks 27, the rock shaft is oscillated and the trip 60 is disengaged from one of the stop arms so that the clutch members are engaged until the trip engages the next succeeding arm of the particular set with which it is at any given time coöperating. The trip can be shifted laterally during the operation of the machine to bring it into line or into coöperative relation with any one of the sets of arms, so that the loose clutch member can be rotated through one-sixth, one-fourth or one-third of a revolution at each operation. In the drawings, the trip is shown in line with the set of four arms 54. In the particular construction shown, the driven clutch member has twelve sprocket teeth and the sprocket wheel 37 over which the chain 36 passes when the planter is used for check-row planting has six, so that the drill shaft is rotated at twice the speed of the wheel axle or main drive shaft 11. The beveled gear 23 is half the size of the beveled gear 24, so that the seed plate 19 is rotated at the same speed as the axle or shaft 11. The seed plate shown is provided with twelve cells, each of which is arranged to receive a single grain of corn. With this arrangement, the seed plate in the different adjusted positions of the trip 60, will be rotated through one-sixth, one-fourth or one-third of a revolution and two, three or four cells will pass over the discharge opening at each operation to deposit a corresponding number of seed in each hill.

The trip 60 and the retaining pawl 59 act to securely hold the loose clutch member 31 in idle position so that the seed plate 19 is arrested with one of the cells accurately registering with the discharge opening of the hopper. The trip 60 which engages the sets of stop arms 53, 54 and 55 of the clutch controlling member, serves to automatically disengage the clutch members and arrest the movement of the loose clutch member. It also serves, as stated in connection with the retaining pawl 59, to hold the loose clutch member in idle position with the clutch dog 45 disengaged. The lugs 49, 50 and 51 form a lost motion connection between the clutch controlling member and the dog 45 so that the spring 61 can act, as described, to throw the dog well away from the ratchet teeth 44 to thereby prevent the chattering of the dog over the teeth or the accidental engagement of the dog therewith.

By the improved construction, the clutch members are engaged and disengaged with certainty to accurately operate the seed plates of the planter. The trip can be readily adjusted during the operation of the machine to vary the throw of the driven clutch member and of the seed plates connected thereto. The construction of the clutch is simple and will not readily get out of order. The arrangement of the driving mechanism for the seed plates of the corn planter herein set forth is claimed in the prior application No. 492,975, above referred to. The present invention is confined to the improved construction of the clutch which can be used for other purposes.

It is obvious that the details set forth may be varied without departure from the essentials of the invention as defined in the claims.

I claim as my invention:—

1. In a clutch mechanism, the combination with rotary driving and driven clutch members, of a third rotary controlling member having a number of sets of stop arms with a different number of arms in each set, a spring for effecting the engagement of said clutch members, a trip arranged to engage said stop arms for arresting said driven clutch member and for holding said clutch members disengaged with said spring under tension, said trip and said clutch controlling member being relatively shiftable to bring said trip into coöperation with any one of said sets of stop arms, and means for shifting said trip out of engagement with said stop arms, substantially as described.

2. In a clutch mechanism, the combination with rotary driving and driven clutch members, a clutch dog movably mounted upon said driven clutch member and shiftable into and out of engagement with said driving clutch member, a rotary controlling member connected to said dog and having a plurality of sets of arms with a different number in each set, a trip arranged to engage said arms and hold said dog in disengaged position, said trip being adjustable into coöperative relation with any one of said sets of arms, and means for shifting said trip into and out of engagement with said arms, substantially as described.

3. In a clutch mechanism, the combination with rotatable driving and driven clutch members, a dog on said driven clutch member, a rotary controlling member for shifting said dog having a plurality of sets of arms with a different number in each set, a spring for throwing said dog into engaged position, a trip normally engaging one of said arms to hold said dog in disengaged position with said spring under tension, said trip and said controlling clutch member being relatively adjustable to bring said trip into operative relation with any one of said sets of arms, and means for shifting said trip into and out of engagement with the arms of any one set, substantially as described.

4. In a clutch mechanism, the combination with a rotatable clutch disk, a rotatable driven clutch member, a dog mounted on said driven clutch member and shiftable into and out of engagement with said clutch disk, a clutch controlling member for shifting said dog having a plurality of sets of arms with a different number of uniformly spaced arms in each set, a spring connecting said driven clutch member and said clutch controlling member and arranged to shift said dog into engagement with said clutch disk, a trip arranged to engage one of said arms and hold said dog in disengaged position, a shifter for adjusting said trip into line with any one of said sets of arms during the operation of said clutch mechanism, and means for shifting said trip into and out of engagement with the arms of any one set, substantially as described.

5. In a clutch mechanism, the combination with rotary driving and driven clutch members, of a clutch dog movably mounted on said driven clutch member, a rotary clutch controlling member operatively connected to said clutch dog and having a circular series of stop arms, a trip arranged to engage and arrest said stop arms to disengage said clutch dog, means for shifting said trip into and out of engagement with said stop arms in succession, and a spring for shifting said dog to engaged position when said trip is disengaged from said stop arms, substantially as described.

6. In a clutch mechanism, the combination with rotary driving and driven clutch members, of a clutch dog for connecting said clutch members, a spring for shifting said dog to engaged position, a rotary clutch controlling member having an axis coincident with the axis of said driving and driven members, and provided with a circular series of stop arms, a trip arranged to engage and arrest said stop arms to thereby disengage said clutch dog, and means for shifting said trip into and out of engagement with said stop arms in succession, substantially as described.

7. In a clutch mechanism, the combination with a drive shaft, of tight and loose clutch members mounted thereon, a clutch dog connecting said members, a clutch controlling member mounted on said shaft and operatively connected to said dog, said controlling member having a plurality of sets of arms with a different number of arms in each set, a trip arranged to engage said arms to hold said dog in disengaged position, said trip being adjustable into line with any one of said sets of arms, means for shifting said trip into and out of engagement with the arms of any one set, and a spring for throwing said dog to engaged position, substantially as described.

8. In a clutch mechanism, the combination with rotary driving and driven clutch members, of a clutch dog mounted on said driven clutch member, a rotary clutch controlling member co-axial with said driving and driven members and having a plurality of sets of arms with a different number of uniformly spaced arms in each set, a trip arranged to engage said arms and hold said clutch dog in disengaged position, a shift lever connected to said trip for moving the same into line with any one of said sets of arms during the operation of the clutch mechanism, means connected to said trip for shifting the same into and out of engagement with the arms of any one set, and a spring for moving said clutch dog to engaged position, when said trip is disengaged from said stop arms, substantially as described.

9. In a clutch mechanism, the combination with rotary driving and driven clutch members, of a dog mounted on said driven clutch member and shiftable into and out of engagement with said driving member, a rotary clutch controlling member operatively connected to said dog and having a circular series of stop arms, a spring connecting said controlling member and said driven member for throwing said dog to engaged position, a trip normally engaging one of said arms to hold said dog in disengaged position with said spring under tension, means for shifting said trip into and out of engagement with said stop arms in succession, said driven clutch member having a series of ratchet teeth corresponding in position to said stop arms and a retaining pawl arranged to engage said ratchet teeth to hold said driven clutch member against backward movement, substantially as described.

10. In a clutch mechanism, the combination of a rotary driving ratchet, a driven sprocket wheel, a clutch dog pivoted on said sprocket wheel and arranged to engage said driving ratchet, a rotary clutch controlling member having an axis co-incident with the axis of said driving ratchet and said sprocket wheel and provided with a circular series of stop arms, said clutch controlling member being operatively connected to said dog, a spring connecting said clutch controlling member and said sprocket wheel for throwing said dog to engaged position, a trip arranged to engage and arrest said stop arms to thereby disengage said clutch dog and hold said spring under tension, means for shifting said trip into and out of engagement with said circular series of stop arms in succession, said sprocket wheel having teeth corresponding in position with said stop arms, a drive chain passing over said teeth, and a retaining pawl arranged to engage said teeth outside of said chain to hold said sprocket wheel against backward movement, substantially as described.

11. In a clutch mechanism, the combination with rotatable driving and driven clutch members, a third rotary clutch controlling member having a number of sets of stop arms with a different number in each set, a spring for effecting the engagement of said clutch members, a trip arranged to engage said stop arms and arrest said driven clutch member to hold the same in disengaged position with said spring under tension, said trip and said clutch controlling member being relatively shiftable to bring said trip into coöperative relation with any one of said sets of stop arms, means for shifting said trip into and out of engagement with said stop arms, said driven clutch member having ratchet teeth corresponding in position to said stop arms, and a retaining pawl arranged to engage said ratchet teeth to hold said driven clutch member against backward movement, substantially as described.

12. In a clutch mechanism, the combination with rotary, driving and driven clutch members, a clutch dog mounted on said driven clutch member and shiftable into and out of engagement with said driving member, a rotary clutch controlling member co-axial with said driving and driven members and having a plurality of sets of arms with a different number of uniformly spaced arms in each set, a spring connecting said clutch controlling member and said driven clutch member for throwing said dog to engaged position, a trip normally engaging one of said arms to hold said dog in disengaged position with said spring under tension, means for moving said trip into line with any one of said sets of arms, means for shifting said trip successively into and out of engagement with the arms of any one set, said driven clutch member having a series of ratchet teeth corresponding in position to said stop arms, and a retaining pawl arranged to engage said ratchet teeth to hold said driven clutch member against backward movement, substantially as described.

CLEMENT W. MICHAEL.

Witnesses:
  ROY WINFIELD MARTIN,
  EDWARD EVAN WILLIAMS.